(12) United States Patent
Brasen et al.

(10) Patent No.: US 7,088,453 B2
(45) Date of Patent: Aug. 8, 2006

(54) OPTICAL DEVICE HAVING A ROTATABLE BIREFRINGENT CRYSTAL

(75) Inventors: Gernot Brasen, Mainz (DE); Christian Laue, Mainz (DE); Matthias Loeffler, Eisenberg (DE)

(73) Assignee: International Business Machines Corporation, Armonk, NY (US)

( * ) Notice: Subject to any disclaimer, the term of this patent is extended or adjusted under 35 U.S.C. 154(b) by 314 days.

(21) Appl. No.: 10/703,307

(22) Filed: Nov. 7, 2003

(65) Prior Publication Data

US 2004/0120043 A1    Jun. 24, 2004

(30) Foreign Application Priority Data

Dec. 20, 2002    (EP) .................... 02102842

(51) Int. Cl.
*G01B 9/02* (2006.01)
(52) U.S. Cl. .................... 356/491; 385/16; 385/25; 359/495

(58) Field of Classification Search ................ 356/491, 356/492, 493, 494, 495, 487; 385/11, 16, 385/17, 18, 19, 20, 21, 22, 23, 24, 25; 359/256, 359/494, 495, 496, 497, 501
See application file for complete search history.

(56) References Cited

U.S. PATENT DOCUMENTS 3,658,405 A * 4/1972 Pluta .......................... 359/371
6,222,632 B1 * 4/2001 Bakin .......................... 356/453

* cited by examiner

*Primary Examiner*—Gregory Toatley
*Assistant Examiner*—Marissa J Detschel
(74) *Attorney, Agent, or Firm*—A. Keith Bates; Dillon & Yudell LLP

(57) ABSTRACT

An optical device has a rotatable birefringent crystal. The crystal is rotatable around a first axis (4; 42) and has a crystallographic-optical axis (6; 44) in a plane that is perpendicular to the first axis. In addition, the crystal is rotated around the first axis in order to control a displacement ($\Delta x$) of a light beam in the plane when the light beam is polarized within the plane and directed onto the crystal.

16 Claims, 3 Drawing Sheets

| Position [°] | Displacement [μm] |
|---|---|
| −40 | +2297 |
| −30 | +2056 |
| −20 | +1542 |
| −10 | +833 |
| 0 | 0 |
| 10 | −833 |
| 20 | −1542 |
| 30 | −2056 |
| 40 | −2297 |

OPTICAL DEVICE HAVING A ROTATABLE BIREFRINGENT CRYSTAL

RELATED APPLICATION

This application claims priority to German Patent Application No. 02102842.8 (International Business Machines Corporation Docket No. DE920020041US1), filed on Dec. 20, 2002, and entitled "OPTICAL DEVICE HAVING A ROTATABLE BIREFRINGENT CRYSTAL."

BACKGROUND OF THE INVENTION

1. Technical Field

The present invention relates to the field of optical devices and more particularly without limitation to beam splitters, optical switches and interferometric phase measurement devices.

2. Description of the Related Art

Some crystalline materials have different indices of refraction associated with different crystallographic directions. A common situation with mineral crystals is that there are two distinct indices of refraction depend on the polarization of the light traveling through the crystal; such crystals are called birefringent materials.

Typically birefringent materials are tourmaline, calcite, quartz, sodium nitrate, and rutile (Ti02). For example, the Wollaston prism makes use of the phenomenon of double refraction or birefringence, through which a crystal of a transparent anisotropic material refracts orthogonally polarized light beams at different angles. Birefringent crystals such as calcite, quartz, and mica are used for fabrication of such prisms:

For example the Wollaston prism includes two wedge-shaped segments held together with adjacent polished surfaces extending along a plane at an oblique angle to the optical axis of the device. The outer surfaces of the Wollaston prism lie along planes perpendicular to the geometrical-optical axis of the device. The two segments of the Wollaston prism are composed of a birefringent material, with the crystallographic-optical axes of the material lying perpendicular to each other and to the geometrical-optical axis of the device.

For example, if a beam of light consisting of two sub-beams polarized orthogonally to each other is directed along the geometrical-optical axis of the device to a Wollaston prism, the two beams will not be refracted at the initial surface of the prism, since it lies perpendicular to the direction of both beams. However, when the two beams reach the oblique inner surfaces of the two segments of the prism, refraction will occur, with the two beams being refracted at different angles because of the birefringence of the material of which the prism segments are composed. When the two beams reach the opposite external side of the prism, they are again refracted. U.S. Pat. No. 5,784,163 shows an interferometer, which uses such a Wollaston prism.

SUMMARY OF THE INVENTION

The present invention provides for an optical device having a birefringent crystal, which is rotatable around a mechanical axis. The crystallographic-optical axis of the crystal is perpendicular to this mechanical axis of the device. By rotating the device around the mechanical axis the crystallographic-optical axis rotates in a plane perpendicular to the mechanical (rotational) axis.

An incident light beam with arbitrary polarization is refracted into an ordinary (o) and an extraordinary (eo) beam inside the birefringent material. The ordinary beam is polarized perpendicular to the rotational plane of the crystallographic-optical axis. The extraordinary beam is polarized within the rotational plane of the crystallographic-optical axis. For example, under normal incidence both beams behave differently: The ordinary beam will not be refracted and will not change its direction. The extraordinary beam is refracted under an angle $\alpha$. The angle of incidence is however not essential as the ordinary and extraordinary beams also have different light paths under other angles of incidence.

For example a uniaxial birefringent crystal such as rutile (Ti02), tourmaline, mica, calcite, quartz, sodium nitrate or the like is used as a birefringent material. Due to this effect the extraordinary light beam is laterally displaced. The amount of lateral displacement depends on the angular position of the crystallographic-optical axis of the birefringent crystal with respect to the incoming light beam. As a consequence the lateral displacement of the extraordinary light beam with respect to the ordinary light beam is controllable by rotating the birefringent crystal.

In accordance with a preferred embodiment of the present invention, the birefringent crystal has the form of a cylinder. In this instance, the cylinder axis defines the mechanical axis for rotating the crystal.

In accordance with a further preferred embodiment of the invention the crystal has the form of an ellipse. In this embodiment the mechanical axis for rotating the crystal is an arbitrary axis perpendicular to the elliptical cross section of the ellipse.

In accordance with a further preferred embodiment of the invention the birefringent crystal is at least partially embedded in index matching fluid.

In accordance with a further preferred embodiment of the invention the crystal has two polygon contours within the plane, which is perpendicular to the mechanical axis and is parallel to the crystallographic axis. Each of the polygons has polygon segments. Adjacent polygon segments enclose a certain angle. In this way facets are provided on the crystal surface. Pairs of facets of the two contours define a light path corresponding to a certain lateral displacement of a ray. By rotating the crystal a number of discrete lateral displacements are selectable. This form of the crystal is particularly advantageous for realising of an optical switch.

Other preferred applications of the invention include beam splitters and optical scanners. Further the present invention can be used for an interferometric phase measurement apparatus as it is as such known from U.S. Pat. No. 5,392,116, the entirety of which is herein disclosed by reference.

In such an interferometric phase measurement apparatus spaced parallel beams are required for measurement of a contour of a surface, such as a step or a slope. The optical device of the present invention can be used to provide such parallel beams. Application of such an optical device to provide the parallel beams is beneficial as the lateral displacement of the beams is controllable simply by rotating the crystal. When one of the beams is an ordinary beam only the displacement of the extraordinary beam is changed by rotating the crystal. In this instance the ordinary beam can be used as a reference, which simplifies the interferometric measurement and also increases its accuracy.

BRIEF DESCRIPTION OF THE DRAWINGS

In the following preferred embodiments of the invention will be described in greater detail by making reference to the drawings in which.

DETAILED DESCRIPTION OF THE INVENTION

Figure 1:
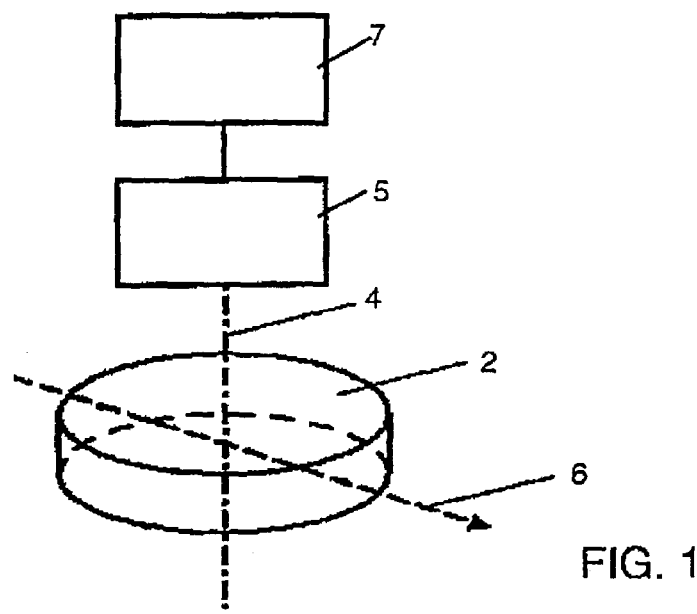
FIG. 1 is a schematic perspective view on a cylindrical optical device.

FIG. 1 shows a birefringent crystal 2, which has the form of a cylinder. The cylinder axis of the crystal 2 defines the position of the central mechanical axis 4. For example mechanical axis 4 is provided by a drive spindle, which is coupled to step motor 5. Step motor 5 is coupled to control unit 7.

Birefringent crystal 2 has crystallographic-optical axis 6. Crystallographic-optical axis 6 is perpendicular to mechanical axis 4. In operation a light beam is directed on crystal 2 in a plane which is perpendicular to mechanical axis 4 and which is parallel to crystallographic-optical axis 6. The angular position of the crystal 2 is selectable by rotating it around mechanical axis 4. This way the amount of lateral displacement of the light beam within the plane, which is perpendicular to mechanical axis 4, is controllable.

For example, a desired lateral displacement or angular position of crystal 2 is input into control unit 7. In response control unit 7 provides a control signal to step motor 5 in order to perform an angular movement of crystal 2 around mechanical axis 4 to bring crystal 2 into the desired position corresponding to the desired lateral displacement.

Figure 2:
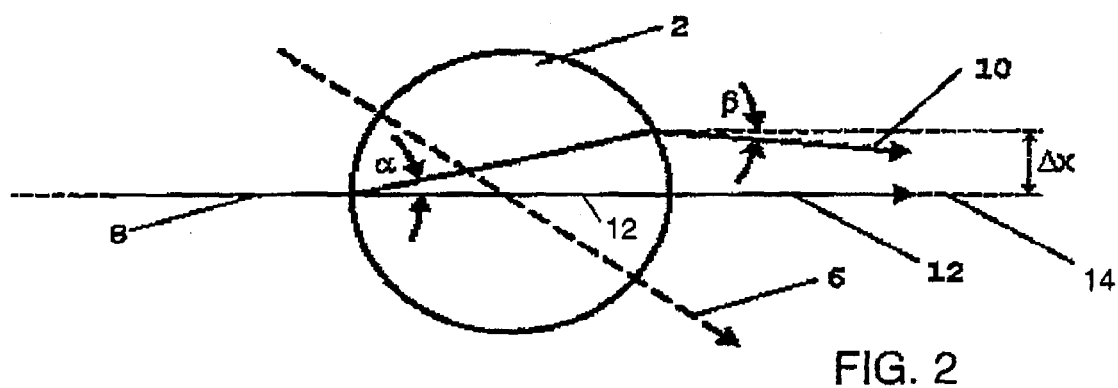
FIG. 2 is a schematic sectional view of the crystal of FIG. 1 illustrating the light path of ordinary and extraordinary light beams.

This principle is further illustrated in FIG. 2. FIG. 2 shows a cross sectional view of crystal 2 in a plane which is perpendicular to mechanical axis 4. Light beam 8 is directed on crystal 2 along the geometrical optical axis 14 of the optical device. For example light beam 8 is a laser beam.

Light beam 8 has a component, which is polarized within a plane, which is parallel to the mechanical axis 4 (cf. FIG. 1). This component advances straight as an ordinary ray 12 on its path through crystal 2 and outside crystal 2. The other component of light beam 8 is polarized within the rotational plane of the crystallographic-optical axis 6 and perpendicular to mechanical axis 4. This component of light beam 8 changes its path with an angle $\alpha$ and advances as an extraordinary ray 10.

When extraordinary ray 10 leaves crystal 2 it again changes its path with an angle $\beta$. The lateral displacement of the extraordinary ray 10 where extraordinary ray 10 leaves crystal 2 is designated as $\Delta x$. The lateral displacement $\Delta x$ depends on the angular position of crystal 2 and can be varied by rotating crystal 2. The amount of lateral displacement $\Delta x$ also depends on the diameter of the crystal.

Figure 3:
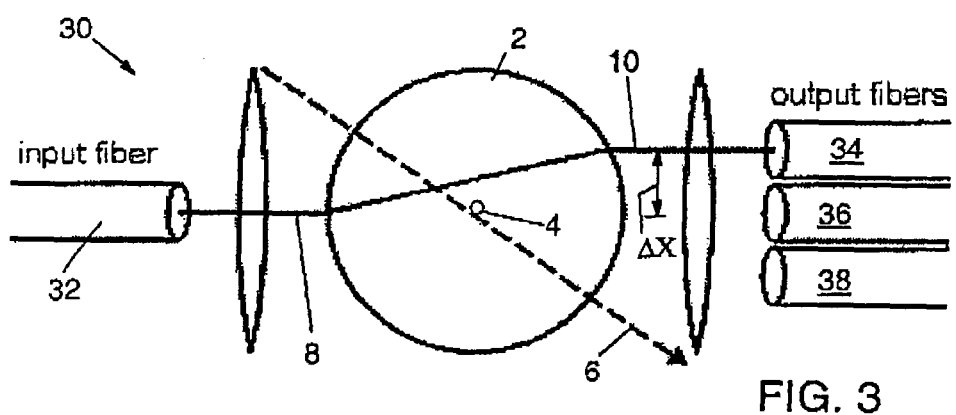
FIG. 3 is illustrative of an application of the present invention for an optical switch.

FIG. 3 illustrates an optical switch 30, which is based on the principles of the present invention. For realising of optical switch 30 the optical device of FIGS. 1 and 2 can be used. Light beam 8 is directed on crystal 2 by input optical fiber 32.

In this application light beam 8 only has a component, which is polarized within the rotational plane, which is perpendicular to mechanical axis 4. As a consequence there is only extraordinary ray 10 at the output of crystal 2. In the preferred embodiment considered here the angle $\beta$ is close to zero and is therefore not shown in the drawing.

The lateral displacement $\Delta x$ of the extra-ordinary ray 10 within the polarization plane depends on the angular position of crystal 2 and its diameter. In the position shown in FIG. 3 the lateral displacement $\Delta x$ is chosen such that extraordinary ray 10 is directed on output optical fiber 34.

By rotating of crystal 2 the lateral displacement $\Delta x$ can be changed such that extraordinary ray 10 is directed on optical fiber 36 or 38. This way light beam 8 can be switched between the optical fibers 34, 36, 38 simply by rotating of crystal 2.

Figures 4, 6:
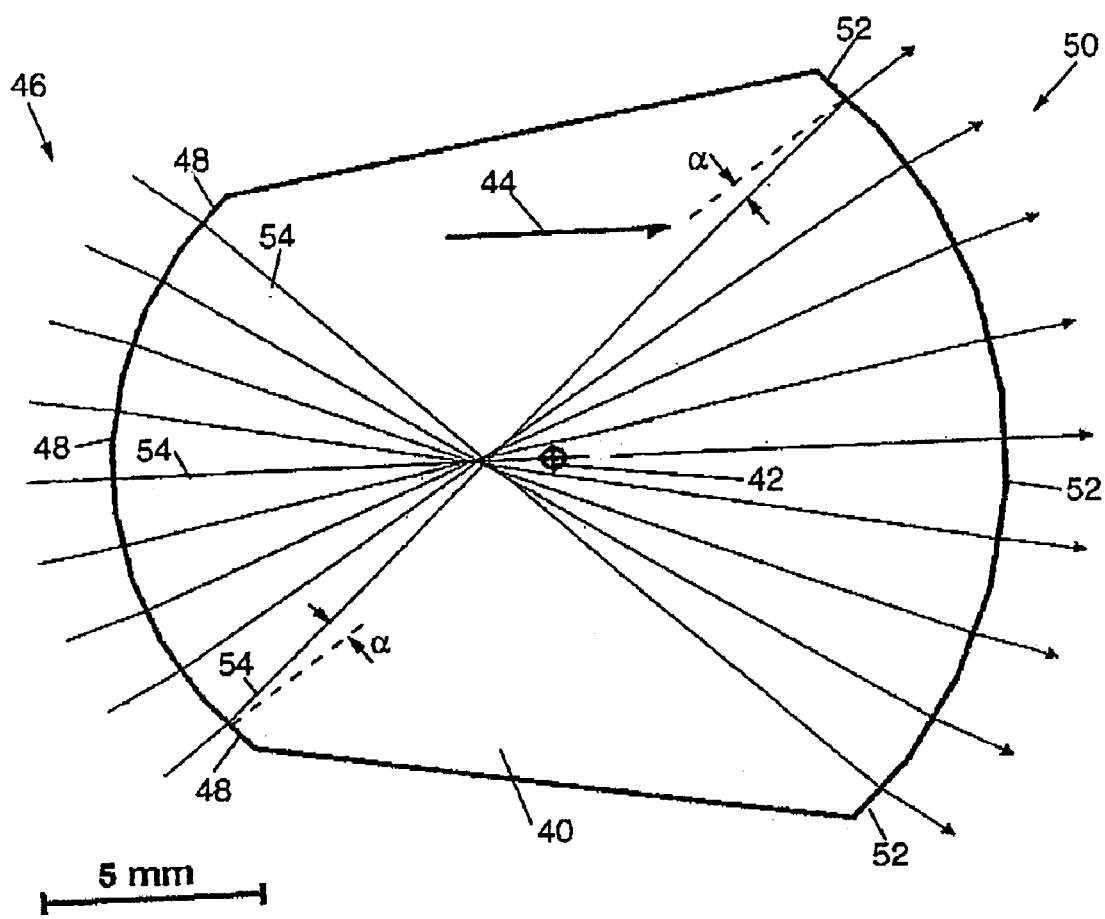
FIG. 4 shows an example of a crystal having polygon contours for providing a number of discrete lateral displacements for the extraordinary light beam.
FIG. 6 is a table showing the discrete lateral displacements of the crystal of FIGS. 4 and 5 depending on its angular position.

FIG. 4 shows an alternative embodiment of a birefringent crystal for improved accuracy of the lateral displacement $\Delta x$. The birefringent crystal 40 has a mechanical axis 42 and a crystallographic axis 44, which is perpendicular to mechanical axis 42.

Crystal 40 has a polygon contour 46. The polygon contour 46 is composed of a number of polygon segments 48 which are offset by an angle of 10°. This way facets are provided on the polygon contour 46 of crystal 40.

On the opposite side crystal 40 has polygon contour 50, which is also composed of polygon segments 52 which are offset, by the same angle as the polygon segments 48 of polygon contour 46. This way pairs of parallel facets on polygon contour 46 and polygon contour 50 are provided.

A pair of parallel facets defines a light path having a certain discrete amount of lateral displacement. This way the paths 54 are defined. Each of the paths 54 has an assigned pair of polygon segments 48 and 52, which are parallel to each other.

Due to the geometry of the polygon segments an extraordinary ray on path 54 is only displaced laterally without a residual deviation $\beta$ as in the embodiment of FIGS. 1 and 2. This is particularly advantageous for providing multiple discrete lateral displacements.

Figure 5:
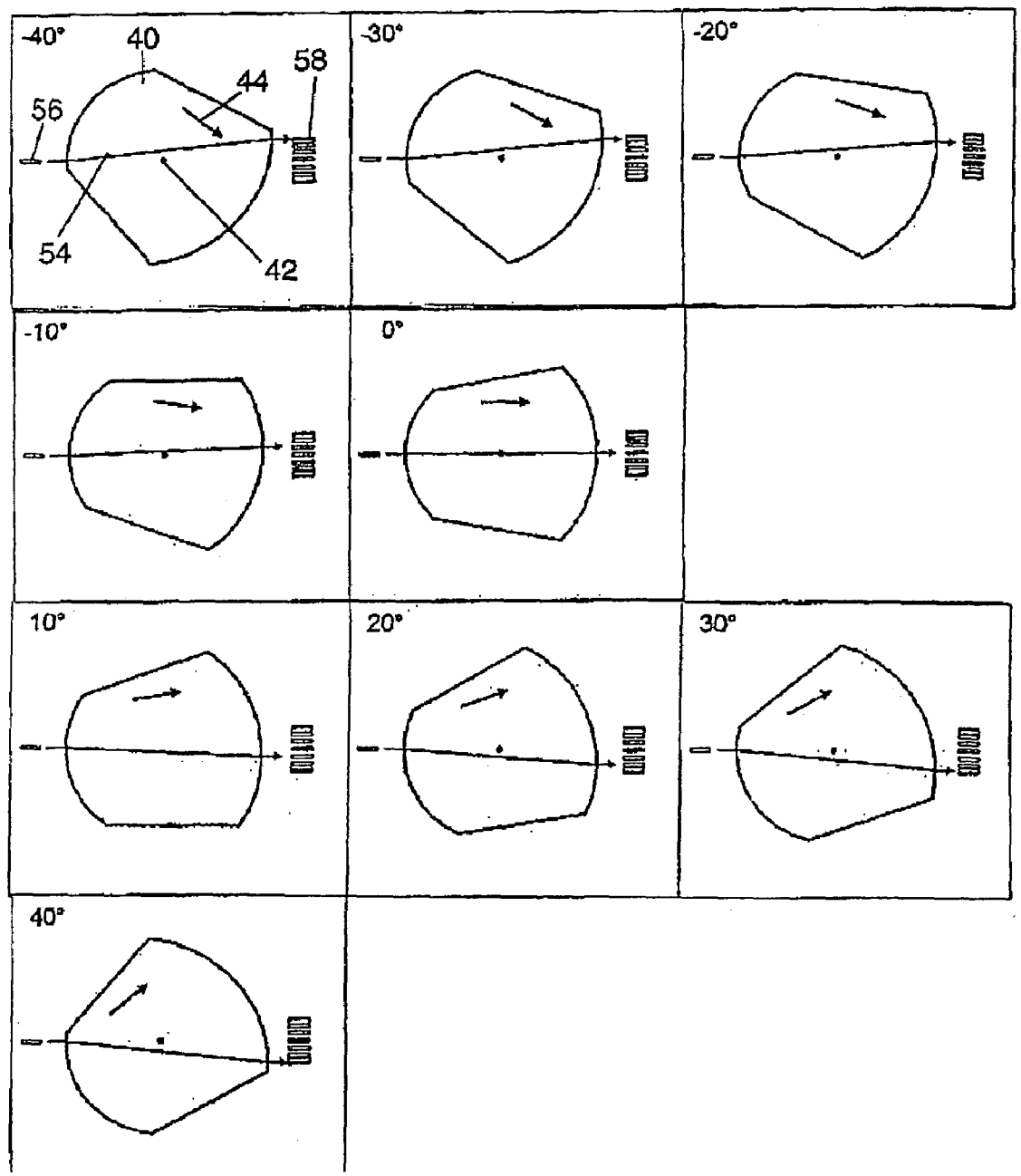
FIG. 5 illustrates various angular positions of the cylinder of FIG. 4 for selectively coupling a light beam to one of a plurality of optical fibers.

FIG. 5 is illustrative of a corresponding application of crystal 4 in order to realise a fiber optics switch. Optical fiber 56 provides a light beam, which travels as an extraordinary ray on path 54. The lateral displacement of the light beam provided by optical fiber 56 depends on the angular position of crystal 40 as illustrated in FIG. 5.

Fiber bundle 58 has a number of nine optical fibers, which correspond to the nine pairs of facets and nine paths 54 provided by crystal 40. By selecting an angular position between −40° and +40° one of the available discrete lateral displacements can be selected for selectively coupling the light beam to a particular one of the optical fibers of fiber bundle 58.

FIG. 6 shows a table relating the angular positions between −40° and +40° in steps of 10° to the corresponding lateral displacements. These numbers are obtained when calcite is used as a birefringent crystal with a crystal diameter of about 20 mm. The aperture of the facets is about 2 mm.

The invention claimed is:

1. An optical device, comprising:
   a birefringent crystal (2; 48), the crystal being rotatable around a first axis (4; 42) and having a crystallographic-optical axis (6; 44) in a plane being perpendicular to the first axis; and
   means (5, 7) for rotating the crystal around the first axis in order to control a displacement ($\Delta x$) of a light beam in the plane when the light beam is polarized within the plane and directed onto the crystal.

2. The optical device of claim 1, wherein the crystal has the form of a cylinder and the first axis is an axis of the cylinder.

3. The optical device of claim 1, wherein the crystal has the form of an ellipse and the first axis is an arbitrary axis perpendicular to an elliptical cross section of the ellipse.

4. The optical device of claim 1, wherein the crystal has a first polygon contour (46) and a second polygon contour (52), the first polygon contour having first polygon segments (48) and the second polygon contour having second polygon segments (52), each one of the first polygon segments having an assigned one of the second polygon segments to define pairs of polygon segments, the polygon segments of a pair of polygon segments being parallel and defining a light path (54) for the light beam.

5. The optical device of claim 4, wherein the first polygon segments are arranged such that first polygon segments being adjacent to each other enclose a same angle.

6. The optical device of claim 4, further comprising a number of optical fibers (58) being juxtaposed to the second polygon contour for selectively directing the light beam to one of the optical fibers.

7. The optical device of claim 1, further comprising means for interferometric phase measurement.

8. The optical device of claim 1, wherein the birefringent crystal is at least partially embedded in index matching fluid.

9. An interferometric phase measurement apparatus, comprising:
   an optical device having a birefringent crystal that is rotatable around a first axis and having a crystallographic-optical axis in a plane being perpendicular to the first axis, and the crystal being rotatable around the first axis in order to control a displacement ($\Delta x$) of a light beam in the plane when the light beam is polarized within the plane and directed onto the crystal; and wherein
   the optical device provides a pair of parallel beams having a controllable lateral distance.

10. The apparatus of claim 9, wherein the crystal has the form of a cylinder and the first axis is an axis of the cylinder.

11. The apparatus of claim 9, wherein the crystal has the form of an ellipse and the first axis is an arbitrary axis perpendicular to an elliptical cross section of the ellipse.

12. The apparatus of claim 9, wherein the crystal has a first polygon contour (46) and a second polygon contour (52), the first polygon contour having first polygon segments (48) and the second polygon contour having second polygon segments (52), each one of the first polygon segments having an assigned one of the second polygon segments to define pairs of polygon segments, the polygon segments of a pair of polygon segments being parallel and defining a light path (54) for the light beam.

13. The optical device of claim 12, wherein the first polygon segments are arranged such that first polygon segments being adjacent to each other enclose a same angle.

14. The optical device of claim 12, further comprising a number of optical fibers (58) being juxtaposed to the second polygon contour for selectively directing the light beam to one of the optical fibers.

15. The apparatus of claim 9, further comprising means for interferometric phase measurement.

16. The apparatus of claim 9, wherein the birefringent crystal is at least partially embedded in index matching fluid.

\* \* \* \* \*